United States Patent
Schmauder et al.

(10) Patent No.: US 8,519,299 B2
(45) Date of Patent: Aug. 27, 2013

(54) LASER PROCESSING MACHINES AND METHODS OF PROCESSING WORKPIECES

(75) Inventors: Frank Schmauder, Metzingen (DE); Andreas Bunz, Leinfelden-Echterdinger (DE)

(73) Assignee: TRUMPF Werkzeugmaschinen GmbH+Co. KG, Ditzingen (DE)

( * ) Notice: Subject to any disclaimer, the term of this patent is extended or adjusted under 35 U.S.C. 154(b) by 0 days.

(21) Appl. No.: 13/480,699

(22) Filed: May 25, 2012

(65) Prior Publication Data

US 2012/0228274 A1 Sep. 13, 2012

Related U.S. Application Data

(62) Division of application No. 12/180,741, filed on Jul. 28, 2008, now Pat. No. 8,217,301.

(30) Foreign Application Priority Data

Aug. 3, 2007 (EP) .................................... 07015250

(51) Int. Cl.
*B23K 26/00* (2006.01)
*B23K 26/38* (2006.01)
*H01S 3/00* (2006.01)

(52) U.S. Cl.
USPC .............. 219/121.6; 219/121.85; 219/121.72; 372/108; 372/109; 700/166

(58) Field of Classification Search
USPC ............... 219/121.67–121.72, 121.6, 121.85, 219/121.86; 700/166; 372/92, 108, 109; 606/11, 12
See application file for complete search history.

(56) References Cited

U.S. PATENT DOCUMENTS

| | | | |
|---|---|---|---|
| 4,436,979 A | 3/1984 | Nilsen | |
| 4,698,480 A | 10/1987 | Klingel | |
| 4,737,000 A | 4/1988 | Garlick et al. | |
| 4,843,209 A | 6/1989 | Milligan | |
| 4,950,861 A | 8/1990 | Erlenmaier et al. | |
| 5,642,512 A | 6/1997 | Tanaka et al. | |
| 7,015,418 B2 | 3/2006 | Cahill et al. | |
| 7,284,396 B2 | 10/2007 | Barron et al. | |
| 2004/0207922 A1* | 10/2004 | Grier et al. | 359/614 |

FOREIGN PATENT DOCUMENTS

| | | |
|---|---|---|
| CN | 111889 A | 3/1996 |
| CN | 1118899 A | 3/1996 |
| JP | 10217050 A | 8/1998 |
| JP | 2000107975 A | 4/2000 |
| JP | 2000237891 A | 9/2000 |
| JP | 200581409 A | 3/2005 |

OTHER PUBLICATIONS

European Search Report for corresponding European Application No. EP 07 015 250.9, mailed Jan. 9, 2008, 6 pages.
Office Action from corresponding Chinese Application No. 200810131158.7, dated Nov. 12, 2010, with English translation, 19 pages.
Office Action from corresponding U.S. Appl. No. 12/180,741, mailed Nov. 3, 2011, 13 pages.

* cited by examiner

*Primary Examiner* — Samuel M Heinrich
(74) *Attorney, Agent, or Firm* — Fish & Richardson P.C.

(57) ABSTRACT

A laser processing machine for processing workpieces, in particular metal sheets, includes a workpiece support and a beam receiver for the laser beam used as a processing tool. The distance between a workpiece lying on the workpiece support and the beam receiver is variable, owing to the fact that the workpiece support and the beam receiver are positionable relative to one another along the beam axis of the laser beam by means of an adjusting drive of an adjusting device with a positioning movement of a variably definable magnitude. A method for processing workpieces, in particular metal sheets, is also provided.

13 Claims, 11 Drawing Sheets

LASER PROCESSING MACHINES AND METHODS OF PROCESSING WORKPIECES

CROSS REFERENCE TO RELATED APPLICATIONS

This application is a divisional of U.S. Ser. No. 12/180,741, filed on Jul. 28, 2008, and also claims priority under 35 USC §119(a) from European Patent Application No. 07 015 250.9, filed on Aug. 3, 2007. The contents of these priority applications are hereby incorporated by reference in their entirety.

TECHNICAL FIELD

This invention relates to laser processing machines and methods of processing workpieces.

BACKGROUND

JP 10-217 050 A discloses a laser processing machine for processing workpieces, in particular metal sheets, by piercing a workpiece to be processed by means of a laser beam, having a workpiece support for supporting a workpiece, a laser processing head and a beam receiver with a receiving opening for the laser beam, and an adjusting device. The laser processing head is arranged on the one side of the workpiece and the workpiece support and the beam receiver are arranged on the opposite side of the workpiece, and the laser beam enters the receiving opening of the beam receiver after piercing through the workpiece. In addition, in particular fumes and slag that occur at the machining point of the laser beam are extracted via the beam receiver. Finally, a beam receiver of the described kind can also be used to discharge sheet cut-outs produced by means of the laser beam from the processing area region of the laser processing machine. A workpiece support having a brush area for supporting the workpiece, is provided with a recess for the beam receiver. The brush area extends right to the edge of the recess for the beam receiver.

When processing flat metal sheets, the beam receiver assumes an upper end position along the beam axis of the laser beam, and projects right through the recess on the workpiece support. At its top face, the beam receiver located in the upper end position lies flush with the free end of the bristles of the brush area of the workpiece support. Accordingly, the sheets to be machined rest both on the brush area of the workpiece support and also on the top face of the beam receiver. To perform the desired processing, for example, to produce cut-outs, the sheet is moved perpendicularly to the laser beam over the brush area and the beam receiver. If a sheet to be processed is provided with a formation that protrudes downwardly with respect to the main plane of the sheet, then when the sheet is moved over the workpiece support this formation would collide with the beam receiver moved into the upper end position.

To avoid such collisions, the beam receiver of the known laser processing machine is lowered by means of an adjusting device into a lower end position as soon as a formation protruding from the underside of the metal sheet approaches the beam receiver located in the upper end position. The lowering movement of the beam receiver is initiated with the aid of detectors, which are provided on the workpiece support close to the recess for the beam receiver and which, when the sheet moves over the workpiece support, are approached by the downwardly protruding formations of the metal sheet to be processed. In the lower end position, the beam receiver lies beneath the workpiece support, so that formations protruding from the underside of the metal sheet can be moved over the beam receiver without collisions. For cutting operations, with the described upper end position the known laser processing machine is provided merely with one single position of the beam receiver.

SUMMARY

The present disclosure features a laser processing machine for processing workpieces, in particular metal sheets, by piercing a workpiece to be processed by means of a laser beam. The laser processing machine includes a workpiece support for supporting a workpiece, a laser processing head and a beam receiver with a receiving opening for the laser beam, and an adjusting device. The laser processing head is arranged on the one side of the workpiece and the workpiece support and the beam receiver are arranged on the opposite side of the workpiece from the laser processing head. The laser beam enters the receiving opening of the beam receiver after piercing through the workpiece, and the adjusting device is configured to vary the distance between the workpiece and the beam receiver existing along the beam axis of the laser beam entering the beam receiver. This variation of the distance is achieved by an adjusting drive of the adjusting device that is configured to position the workpiece support and the beam receiver relative to one another with a with a positioning movement of variably definable magnitude along the beam axis of the laser beam.

The distance that exists along the beam axis of the laser beam between the workpiece support and the beam receiver can be adjusted to any desired distance value within the limits prescribed by construction. The distance between a workpiece to be processed or a processed workpiece and the beam receiver can consequently be regulated with the greatest possible flexibility. The distance between the workpiece and the beam receiver can be matched in an optimum manner to the particular requirements.

In some implementations, the workpiece support and the beam receiver are positioned relative to one another by means of the adjusting drive of the adjusting device such that different distances between the workpiece and the beam receiver are associated with different processing phases of the workpiece processing. In different phases of the workpiece processing, different distances between the workpiece and the beam receiver may be expedient. If, for instance, a workpiece is moved with a comparatively rapid positioning movement relative to the beam receiver, then it may be preferable to adjust the distance between the workpiece and the beam receiver to a comparatively large distance value. If the workpiece support has, for example, brush areas for supporting the workpiece, then one can expect the brushes of the brush areas to bend appreciably during a rapid positioning movement of the workpiece and accordingly the sheet to move towards the beam receiver. Despite that, if there is a correspondingly large distance between the workpiece and the beam receiver, the workpiece is prevented from coming into contact during its positioning movement with the beam receiver and being damaged, for example, by scratching.

Movements that a workpiece and the beam receiver perform relative to one another during laser processing of the workpiece are generally substantially slower than the positioning movements of the kind described above. For instance, when using workpiece supports with brush areas, an at most slight bending of the brushes of the workpiece support occurs as a consequence of the processing movement of workpieces, and, associated therewith, only an at most slight convergence of the workpiece and the beam receiver. Under these circumstances, by a correspondingly mutual adjustment of workpiece and beam receiver, the distance between a workpiece and the beam receiver for the processing movement can be set to a smaller distance value than during the rapid positioning movement of workpieces. A small distance value is sufficient to avoid contact between workpiece and beam receiver during the processing movement and consequential damage to the workpiece.

In the interests of optimum conditions during laser processing of workpieces, it is basically advisable to select at any one time the minimum possible value for the distance between the workpiece and the beam receiver. With a minimum distance from the workpiece, the beam receiver is able to fulfill its intended function in the optimum manner. In particular, with a minimum distance from the workpiece, the beam receiver is able to develop a maximum extraction effect and remove fumes and slag arising at the processing point of the laser beam in a particularly operationally reliable manner. Furthermore, with a minimum distance from the workpiece, the beam receiver can also effectively act as a barrier to lateral flying sparks originating from the processing point of the laser beam. Such flying sparks could lead to damage to devices close to the processing point, for example, the ignition of the brushes of the workpiece support.

A distance value of zero for the distance between workpiece and beam receiver is actually desirable. A corresponding mutual position adjustment of the workpiece support and the beam receiver is less advisable, however, during positioning movements and during processing movements of a workpiece in view of the associated risk of damage to the workpiece. But in some implementations, such a mutual position adjustment is provided for cases with no relative movement of workpiece and beam receiver. During workpiece processing, a relative movement of workpiece and beam receiver is omitted, for example, when a relative movement of laser processing head and workpiece necessary for the workpiece processing is produced exclusively by moving the laser processing head. A movement solely of the laser processing head can be performed, for instance, during the final severance cut to produce cut-outs from a sheet.

In some implementations, the material and, preferably in the case of sheet metal processing, the workpiece thickness are taken into account as parameters for dimensioning the distance between the workpiece and the beam receiver and hence for the mutual positioning of the workpiece support and the beam receiver. The material of workpieces to be processed is, inter alia, relevant inasmuch as the degree of spark formation at the processing point of the laser beam and the rigidity, and hence the extent of the sag of the workpiece above the beam receiver, are also dependent on material. The thickness of the workpiece or sheet metal is relevant in particular for the rigidity and hence for the degree of sag above the beam receiver.

In some cases, the distance between the workpiece and the beam receiver can be kept constant by corresponding mutual positioning of the workpiece support and the beam receiver for the duration of at least one processing phase of the workpiece processing. The drive control provided for that purpose for the adjusting drive of the adjusting device ensures a uniform spacing between workpiece and beam receiver in the interests of optimum procedures and processing results. For example, a mutual adjustment of the workpiece support and the beam receiver undertaken at the start of a processing phase can, as necessary, be altered during the subsequent workpiece processing by corresponding control of the adjusting drive of the adjusting device, such that the distance between the workpiece and the beam receiver remains the same throughout the entire processing phase. A prerequisite for the described regulation of the distance is a continuous monitoring or determination of the distance between the workpiece and the beam receiver. The drive control responds to changes in distance, for instance as a result of unevenness in the sheet, by controlling the adjusting drive to maintain or restore the distance to be kept constant.

A drive control of the adjusting drive for adjustment of the mutual distance between the workpiece and the beam receiver is preferred which is at least partially formed by a drive control of an adjusting drive for adjustment of the mutual distance between the laser processing head and the workpiece. Such an adjusting drive for adjustment of the mutual distance between the laser processing head and the workpiece is, for example, provided on known laser processing machines of the firm TRUMPF®, 71254 Ditzingen, Germany. Primarily, it ensures a consistent focal position of the laser processing beam during workpiece processing and during the associated relative movement of workpiece and laser processing head. Devices that are provided for regulating the distance between the laser processing head and the workpiece can be used simultaneously for regulation of the distance between the workpiece and the beam receiver. By virtue of this dual use, the expense necessary for regulating the distance between the workpiece and the beam receiver is reduced to a minimum.

The distance value to which the distance between the workpiece and the beam receiver is to be set, and hence also the magnitude of the positioning movement for the mutual positioning of workpiece support and beam receiver, can be defined in different ways.

For the sake of simplicity, it is possible to resort to empirically determined distance values that are stored in a memory of a numerical drive control of the adjusting drive for mutual positioning of workpiece support and beam receiver.

Alternatively, e.g., to optimize the method by adapting it individually to the particular application, the distance value can be set to be determined at the particular workpiece to be processed.

To determine a distance value to be set for the distance between the workpiece and the beam receiver, use may in some cases be made of the device already mentioned above for adjusting the mutual distance between the laser processing head and the workpiece.

In another aspect, the invention features a machining process for processing workpieces, which can be implemented by means of a laser processing machine of the said kind. In some implementations, the method is implemented under program control. To compile the control program, a method intended for that purpose is used, which can be carried out on a data processing system by means of a computer program product. Thus, the invention also features a corresponding processing program for operating a laser processing machine, a method for compiling such a processing program and a computer program product having coding means, which permit implementation of the said method to compile a processing program.

In some implementations, the distance value to be set for the distance between the workpiece and the beam receiver is determined at the workpiece to be processed according to a determination method having the following process steps: (a) the workpiece support and the beam receiver are positioned relative to one another in the direction of the beam axis of the laser beam to a mutual distance with the distance value zero, (b) with the workpiece on the workpiece support and on the beam receiver, starting from mutual distance with the distance value zero, the workpiece support and the beam receiver are positioned relative to one another in the direction of the beam axis of the laser beam with removal of the beam receiver from the workpiece, (c) during the mutual positioning of workpiece support and beam receiver with removal of the beam receiver from the workpiece, the moment at which the workpiece above the beam receiver reaches its maximum sag is determined, (d) at the moment at which the metal sheet above the beam receiver reaches its maximum sag, the actual value of the mutual distance between the workpiece support and the beam receiver is determined, and (e) on the basis of the actual value determined, the distance value to be set for the distance between the workpiece and the beam receiver is determined. As a result of this method, a distance value is obtained for the mutual distance between the workpiece and the beam receiver, and hence a magnitude for the mutual positioning movement of workpiece and beam receiver, in which contact between the workpiece and the beam receiver is reliably avoided. A scratch-free processing of the workpiece with relative movement of workpiece and beam receiver is consequently possible.

In some implementations, the maximum sag of the workpiece above the beam receiver is determined by distance measurement, e.g., the distance existing along the beam axis of the laser beam between a reference level and the workpiece above the beam receiver. In particular, the above-mentioned device for adjusting the mutual distance between the laser processing head and the workpiece is suitable for this distance measurement.

In some implementations, either exclusively the workpiece support or exclusively the beam receiver is moved by an adjusting drive motor along the beam axis of the laser beam for the mutual positioning of the workpiece support and the beam receiver. This allows an adjusting drive to be used that has only a single adjusting drive motor, and moreover allows a simple regulation of the mutual distance of workpiece support and beam receiver.

In some cases, drive components are used both for the mutual positioning of the workpiece support and the beam receiver, and the discharge of products of the workpiece processing from the working region of the laser beam. This dual use allows savings to be made on components and consequently provides a structurally simple and inexpensive implementation of the invention.

In some implementations, to discharge products of the workpiece processing, the workpiece support and the beam receiver are jointly moved. A mutual positioning movement of the workpiece support and the beam receiver is effected with impeding of movement, in particular with blocking either of the workpiece support or of the beam receiver relative to the respective other part. This allows the functions of discharging and mutual positioning to be combined.

In the interests of a structurally simple and permanently operationally reliable solution, in a preferred construction of the invention a stop is provided for blocking the workpiece support or the beam receiver. The stop may be active in the direction of the positioning movement.

In some implementations, this stop is advantageously adjustable in the direction of the mutual positioning movement of beam receiver and workpiece support. In this way, different end positions of the component, i.e. either the beam receiver or the workpiece support, braced against the stop, can be defined in the direction of the mutual positioning movement. If the maximum regulating distance during mutual positioning of the workpiece support and beam receiver is fixed, then the end position of the component not braced against the stop also varies as the stop is displaced. By displacement of the stop, wearing of the support that occurs during operation can be allowed for.

The details of one or more embodiments of the invention are set forth in the accompanying drawings and the description below. Other features and advantages of the invention will be apparent from the description and drawings, and from the claims.

DETAILED DESCRIPTION

Figure 1:
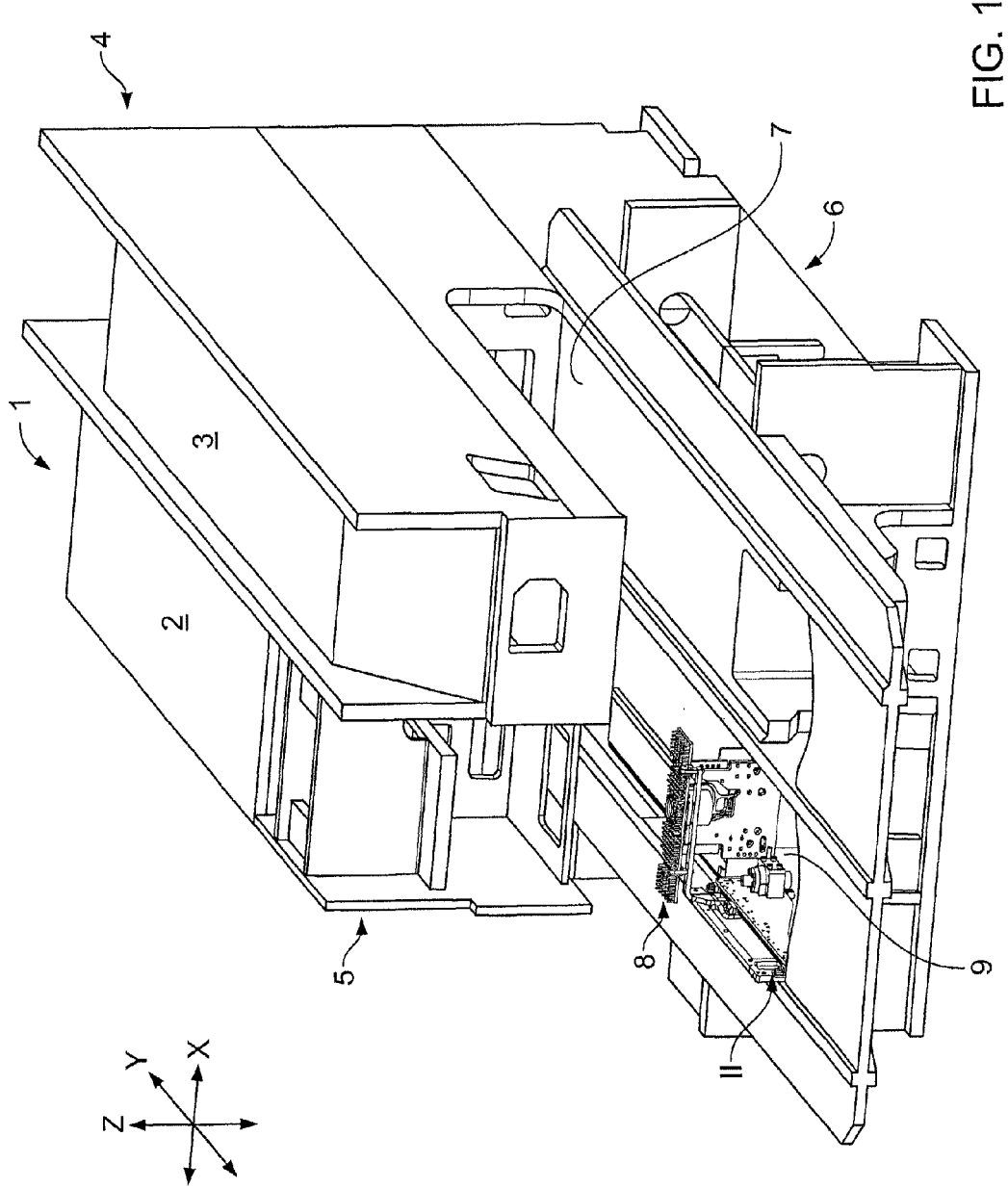
FIG. 1 is a perspective partial view of a laser processing machine with a unit for laser cutting of sheets and with a unit for punching sheets.

According to FIG. 1, a laser processing machine 1 in the form of a combination machine comprises a unit 2 for laser cutting of metal sheets and combined therewith a unit 3 for punching metal sheets. A common machine frame 4 has a C-shaped form and comprises an upper frame leg 5 and a lower frame leg 6. The punching head (not shown) of the unit 3 for punching and the laser machining head (also not shown) for laser cutting workpieces and metal sheets are mounted side by side at the free end of the upper frame leg 5. Both the punching head and the laser machining head are of conventional construction. The laser machining head is movable at the upper frame leg 5 in the three axial directions of an x/y/z co-ordinate system over in each case a comparatively short distance.

A coordinate guide of conventional construction (not shown) is housed in a throat region 7 of the C-shaped machine frame 4. Metal sheets to be processed are fixed to the co-ordinate guide by means of conventional clamping brackets and can be moved by means of the co-ordinate guide with respect to the punching head and also with respect to the laser processing head of the laser processing machine 1 in the horizontal plane spanned by the x-axis and the y-axis. The movement of the metal sheets generated by the co-ordinate guide can serve both for positioning the particular sheet with respect to the relevant processing device, and for the purpose of processing the metal sheet. Additional positioning and processing movements are possible at the laser processing head by virtue of the above-described mobility of the laser processing head.

During its movement over the lower frame leg 6, the metal sheet in question lies in the conventional manner on a brush support disposed on the top face of the lower frame leg 6. This brush support is shown in FIG. 1 covering the extent of a workpiece support 8 of the unit 2 for laser cutting.

Together with further parts of the brush support on the lower frame section 6, the workpiece support 8 forms a cover for a discharge opening 9 of the lower frame leg 6. In the example case shown, sheet cut-outs that have previously been obtained by means of the laser processing head from large-format sheet metal plates are removed via the discharge opening 9.

Figure 2:
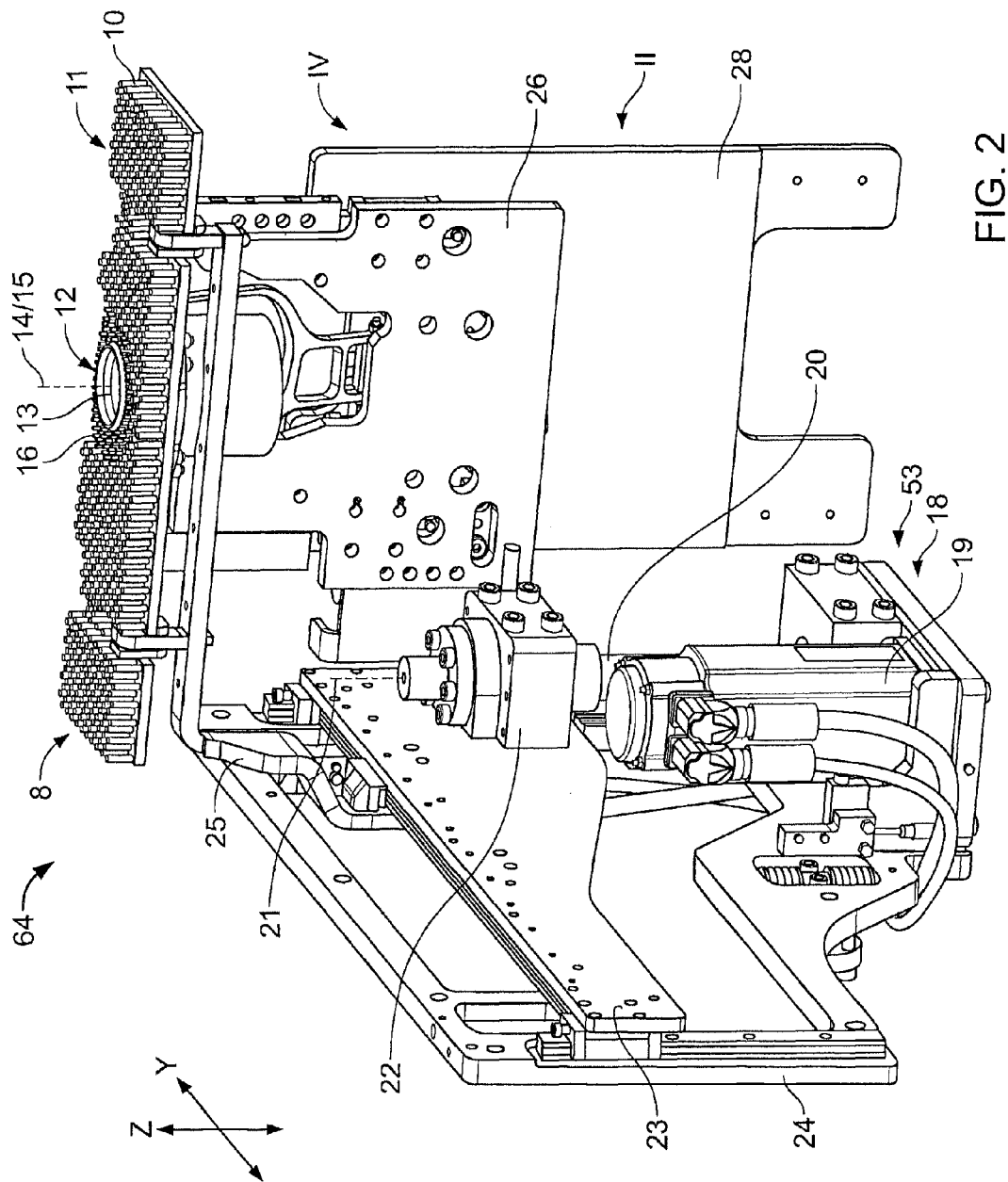
FIG. 2 shows of the assembly II according to FIG. 1 in a first operational state.

In the horizontal orientation of the workpiece support 8, both the sheet metal plates to be processed and the workpiece cut-outs obtained therefrom lie on the free ends of bristles 10, which in their turn form a brush area 11 of the workpiece support 8 (FIG. 2). The workpiece support 8 is part of an assembly II, which is shown in a detail view in FIG. 2.

Apart from the workpiece support 8, the assembly II comprises a beam receiver 12 with a receiving opening 13. During laser cutting of metal sheets in the direction of a laser beam 15, which is indicated in FIG. 2 by a beam axis 14, the beam receiver 12 is arranged with the receiving opening 13 below the laser processing head. After piercing the metal sheet to be processed, the laser beam 15 enters the receiving opening 13 of the beam receiver 12. At the same time, the beam receiver 12 is connected to a source of vacuum, not shown. By means of this vacuum source, fumes and slag that form at the processing point of the laser beam 15 during cutting of the sheets to be processed are extracted via the beam receiver 12. Bristles 10 are arranged around an annular edge 16 of the beam receiver 12 and extend right to the edge 16 of the beam receiver 12.

To discharge sheet cut-outs from the processing region of the laser beam 15, the workpiece support 8 and the beam receiver 12 jointly perform a discharging movement. In addition, the workpiece support 8 and the beam receiver 12 are positionable relative to one another along the beam axis 14 of the laser beam 15. Both functions are implemented with the aid of a drive 18, which consequently forms a discharge and adjusting drive.

A drive motor 19 of the drive 18 with a reversible direction of rotation accordingly serves inter alia as adjusting drive motor. By means of a toothed belt, not shown, the drive motor 19 drives a ball screw spindle 20 about a rotation axis 21 of the spindle. A spindle nut 22 seated on the ball screw spindle 20 and movable along the rotation axis 21 of the spindle is screwed to a drive plate 23, which in turn is movably guided in the z-direction at a guide plate 24 fixed to the machine frame. On the side remote from the spindle nut 22, the drive plate 23 in its turn guides an angled driver 25 in the y-direction. To guide the driver 25, two linear guides spaced from one another in the z-direction are provided on the drive plate 23. The driver 25 is pivotally connected at two bearing points to the workpiece support 8 by means of a horizontal arm.

Figure 4:
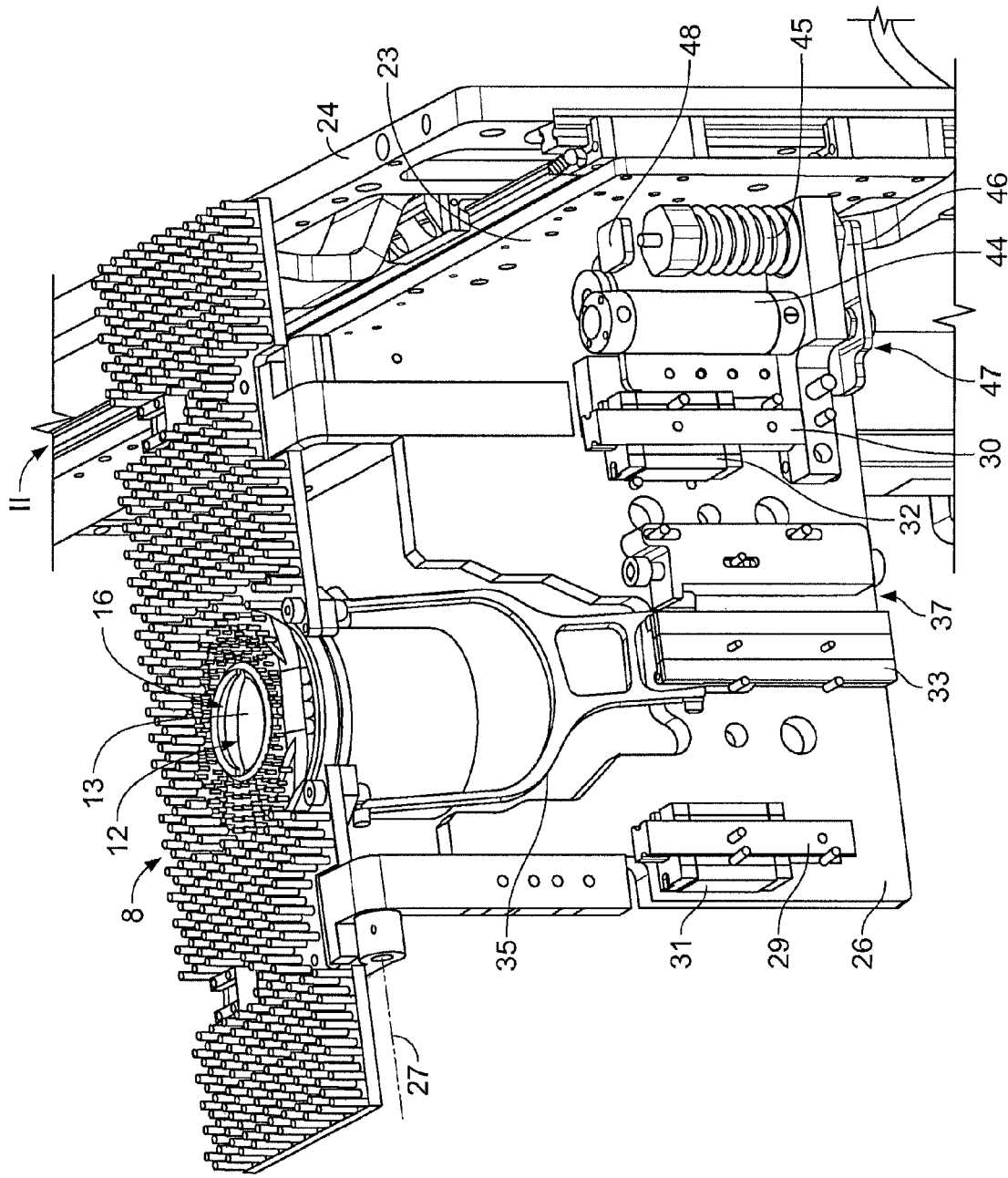
FIG. 4 shows the arrangement according to FIGS. 2 and 3 viewed in the direction of the arrow IV in FIG. 2, FIG. 5 show the assembly II according to FIG. 1 in a second operational state.

Pivot bearings are likewise provided between the workpiece support 8 and a vertically movable plate 26. These pivot bearings define a pivot axis 27 of the workpiece support 8 (FIG. 4). In addition, the pivot bearings between the vertically movable plate 26 and the workpiece support 8 form stops for the workpiece support 8 which prevent the workpiece support 8 from being able to pivot upwards beyond it is horizontal position.

Figure 3:
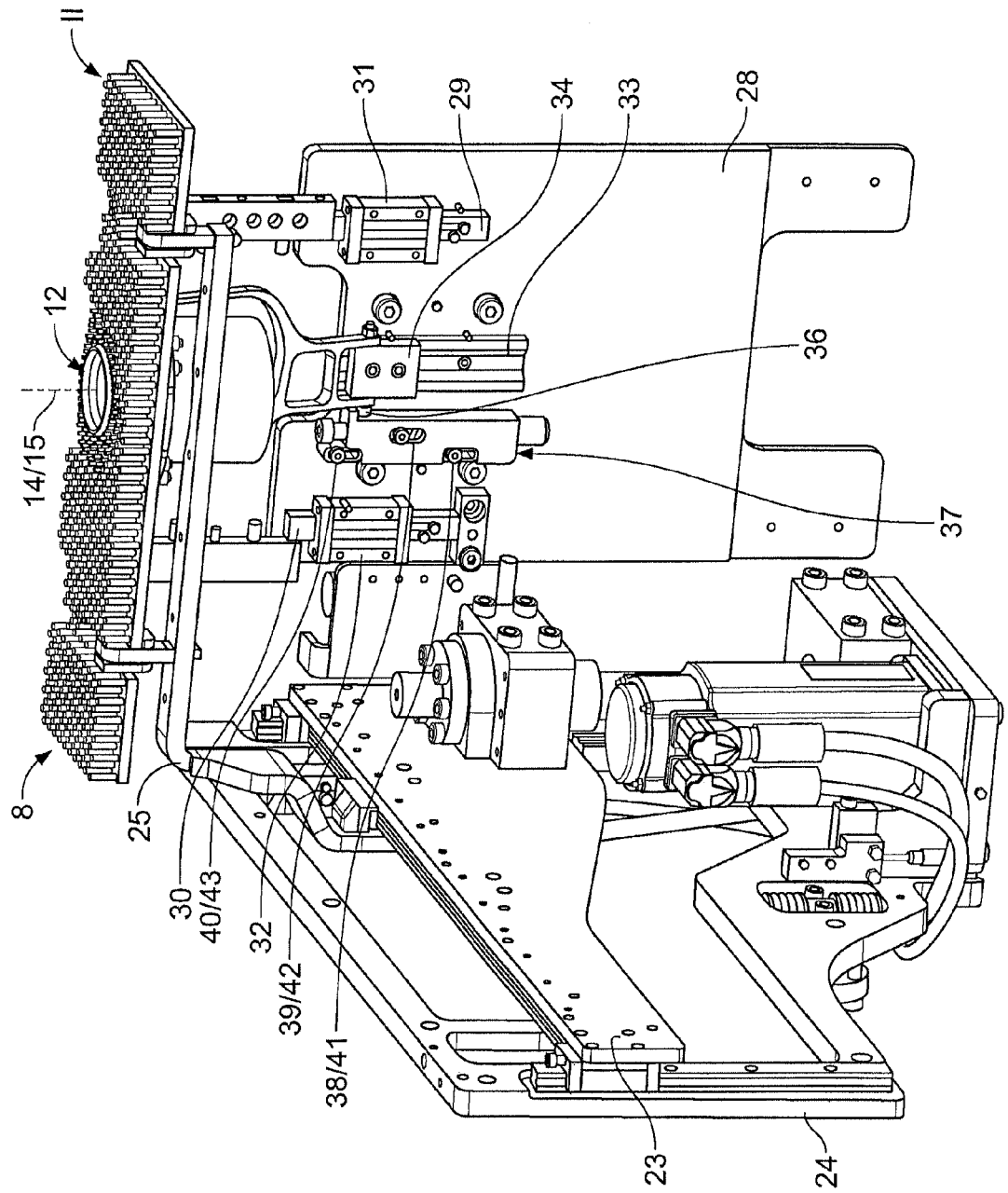
FIG. 3 shows a detail view of the arrangement according to FIG. 2.

The vertically movable plate 26 is slidably guided in the z-direction at a second guide plate 28 fixed to the machine frame. For this purpose, the guide plate 28 is provided with guide rails 29, 30 running in the z-direction (FIGS. 3, 4). Linear bearings 31, 32 seated on the guide rails 29, 30 are mounted on the vertically movable plate 26.

Between the guide rails 29, 30 for guiding the vertically movable plate 26, the guide plate 28 is provided with a guide rail 33, likewise running in the z-direction (FIGS. 3, 4). The guide rail 33 supports a guide slide 34, which in turn is hinged to the lower end of a forked connecting rod 35. At its upper end facing the workpiece support 8, the connecting rod 35 is pivotally connected to the beam receiver 12. A pivot pin of the articulation between the lower end of the connecting rod 35 and the guide slide 34 seated on the guide rail 33 is extended beyond the bearing eyes on the connecting rod 35 and forms with one of the resulting projecting ends a counter-stop 36, which is associated with a stop 37. The stop 37 is mounted in a floating manner in the z-direction by way of a total of three connecting screws 38, 39, 40 on the guide plate 28 fixed to the machine frame. The connecting screws 38, 39, 40 here pass through slots 41, 42, 43, which extend in the stop 37 with their longitudinal axis in the z-direction.

On its side remote from the vertically movable plate 26, the guide plate 28 fixed to the machine frame supports a preloading cylinder 44 and a damped stop 45 (FIG. 4). A piston rod, not visible in FIG. 4, emerging downwards from the preloading cylinder 44 is screwed at its free end to a flange 46, which is formed by an extension piece of a shaped part 47. The shaped part 47 is securely connected to the vertically movable plate 26. Opposite the flange 46, a stop projection 48 projects from the shaped part 47 and overlaps the damped stop 45 mounted on the guide plate 28.

In FIGS. 1 to 4, the assembly II is shown with the workpiece support 8 oriented horizontally. In this operational state of the assembly II, finished parts that have been cut free by means of the laser beam 15 are supported at least partially by the workpiece support 8, specifically by the brush area 11 thereof. To discharge the processed products supported by the workpiece support 8, the workpiece support 8 performs jointly with the beam receiver 12 the discharging movement already mentioned above. This discharging movement has a translational and a rotary component. The translational movement of the workpiece support 8 and beam receiver 12 is performed in the z-direction. A rotary movement about the pivot axis 27 of the workpiece support 8 follows this linear movement.

As shown in FIGS. 1 to 4, the drive plate 23 at the guide plate 24 fixed to the machine frame assumes its upper end position in the z-direction. In this upper end position, by way of the spindle nut 22 and the ball screw spindle 20 the drive plate 23 is blocked against downward movement by the drive motor 19. The driver 25 supported in the z-direction on the drive plate 23 holds the workpiece support 8 and via this the beam receiver 12 and the vertically movable plate 26 in the illustrated position. Owing to suitable preloading, the preloading cylinder 44 and its piston rod acting on the shaped part 47 exert a downwardly directed force in the z-direction on the vertically movable plate 26 and thus also on the beam receiver 12 and on the workpiece support 8. This force is counteracted by the counter-force generated by the drive motor 19. The workpiece support 8 is supported in its horizontal position by the stops at its hinged connection with the vertically movable plate 26.

If the drive motor 19 is switched on and operated with the corresponding direction of rotation in this operational state of the assembly II, then the spindle nut 22 on the ball screw spindle 20, and with the spindle nut 22 the drive plate 23, move downwards, starting from their position shown in FIGS. 1 to 4. Synchronously with the drive plate 23, the vertically movable plate 26 and the beam receiver 12 and the workpiece support 8 move in the negative z-direction under the effect of the preload force now released at the preloading cylinder 44.

Owing to the synchronous movement of drive plate 23 and workpiece support 8, the driver 25 at the driver plate 23 initially maintains the position in the y-direction shown in FIGS. 1 to 4.

After a downward stroke of about twenty millimeters, the stop projection 48 on the shaped part 47 connected to the vertically movable plate 26 comes into contact with the damped stop 45 fixed to the machine frame. The damped stop 45 blocks the vertically movable plate 26, and with this the beam receiver 12 and the workpiece support 8, against further linear movement in the negative z-direction. The translational component of the discharging movement of workpiece support 8 and beam receiver 12 is thus ended.

The drive plate 23 continues to be moved in the negative z-direction by the drive motor 19. Owing to the downward movement of the drive plate 23, the driver 25 is displaced along the drive plate 23 in the y-direction towards the workpiece support 8. At the same time, the driver 25 pivots the workpiece support 8 together with the beam receiver 12 downwards about the pivot axis 27 of the workpiece support 8. In this way the rotary part of the discharging movement of the workpiece support 8 and beam receiver 12 is obtained.

Figure 5:
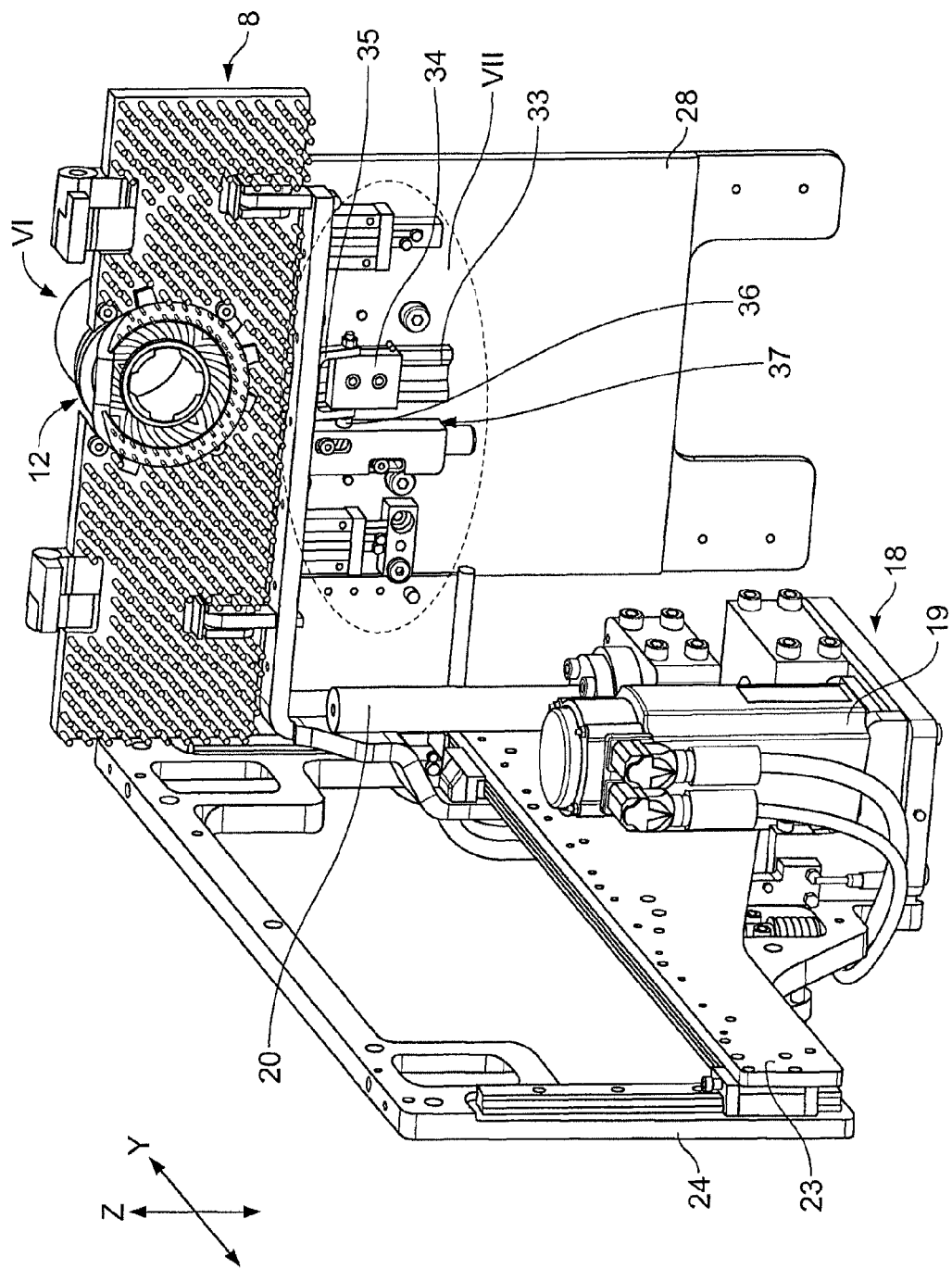
Figure 6:
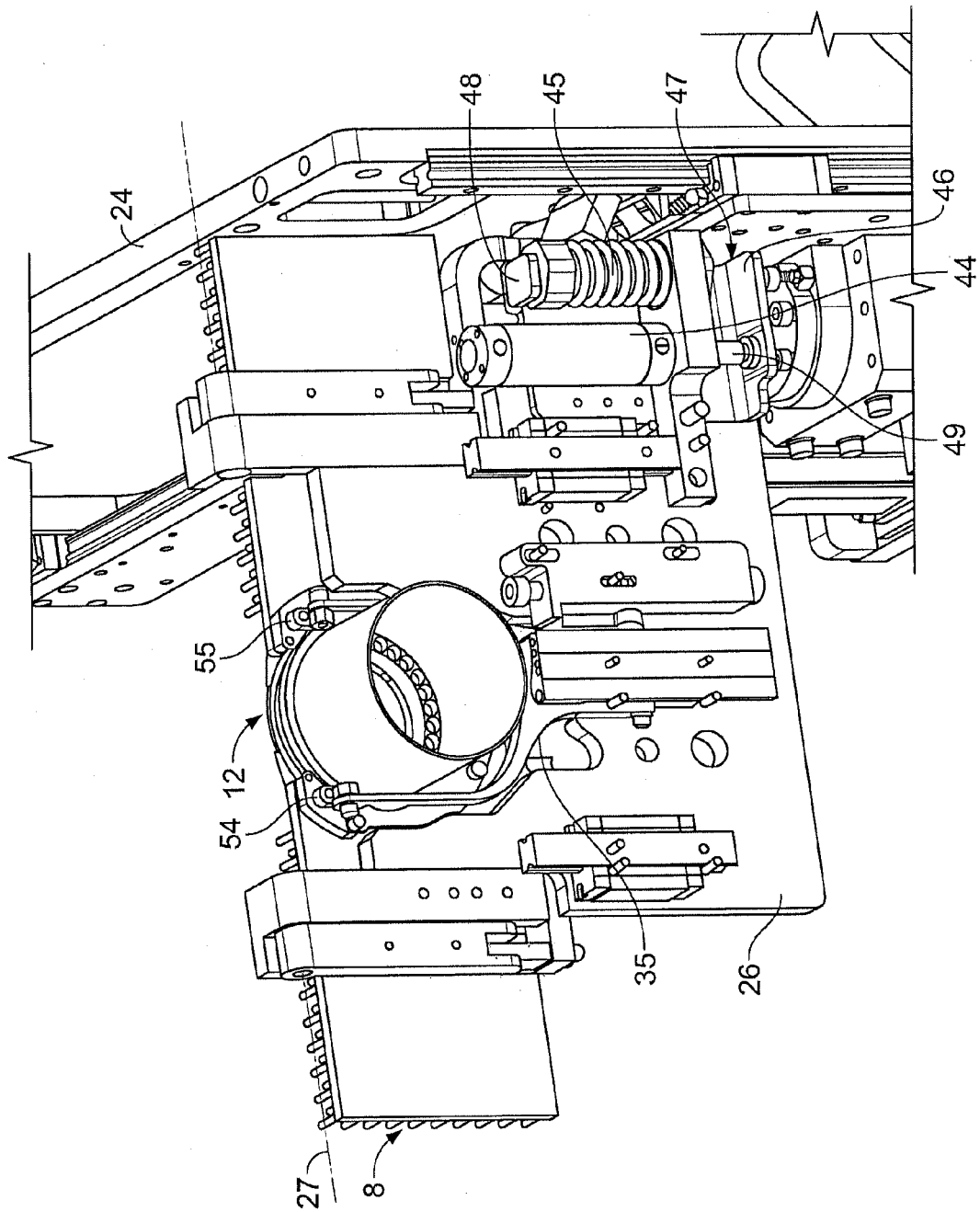
FIG. 6 shows the arrangement according to FIG. 5 viewed in the direction of the arrow VI in FIG. 5.
Figure 7:
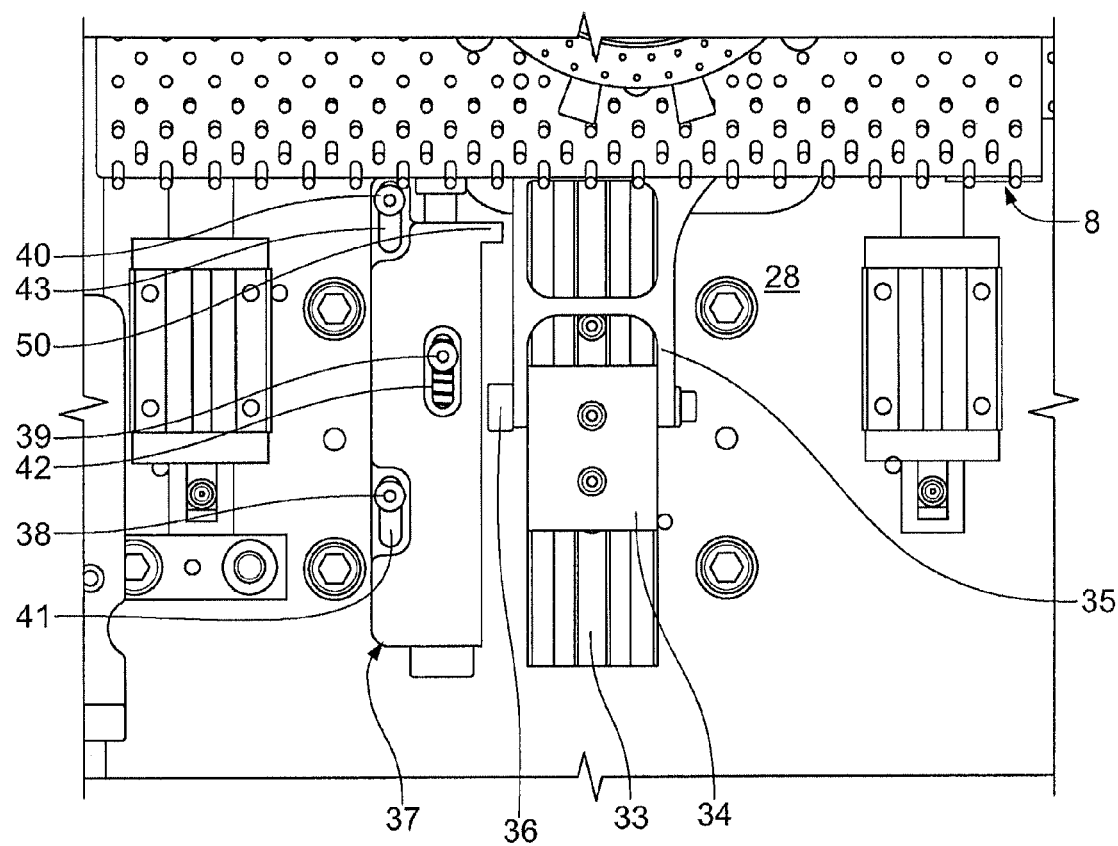
FIG. 7 shows the detail VII in FIG. 5 in the operational state according to FIG. 5, FIGS. 8 and 9 show the arrangement according to FIG. 7 in two further operational states.

By switching off the drive motor 19, the discharging movement of workpiece support 8 and beam receiver 12 is ended as soon as the conditions shown in FIGS. 5 to 7 are achieved within the assembly II.

FIG. 6 shows the arrangement according to FIG. 5 from the side of the guide plate 28 fixed to the machine frame. The piston rod 49 is disposed between the preloading cylinder 44 fixed to the machine frame and the flange 46 of the shaped part 47 connected to the vertically movable plate 26, as can be seen in FIG. 6. FIG. 6 also shows the stop projection 48 of the shaped part 47, the stop projection 48 resting on the damped stop 45.

FIGS. 5 to 7 also show the conditions in the region of the linear guide of the lower end of the connecting rod 35 on the guide plate 28 fixed to the machine frame. The lower end of the connecting rod 35 and the guide slide 34 articulated thereon take up a position in the z-direction on the guide rail 33 connected to the guide plate 28 in which the counter-stop 36 movable in the z-direction along the guide rail 33 is spaced its maximum distance from a stop projection 50 of the stop 37 on the guide plate 28.

Figure 10:
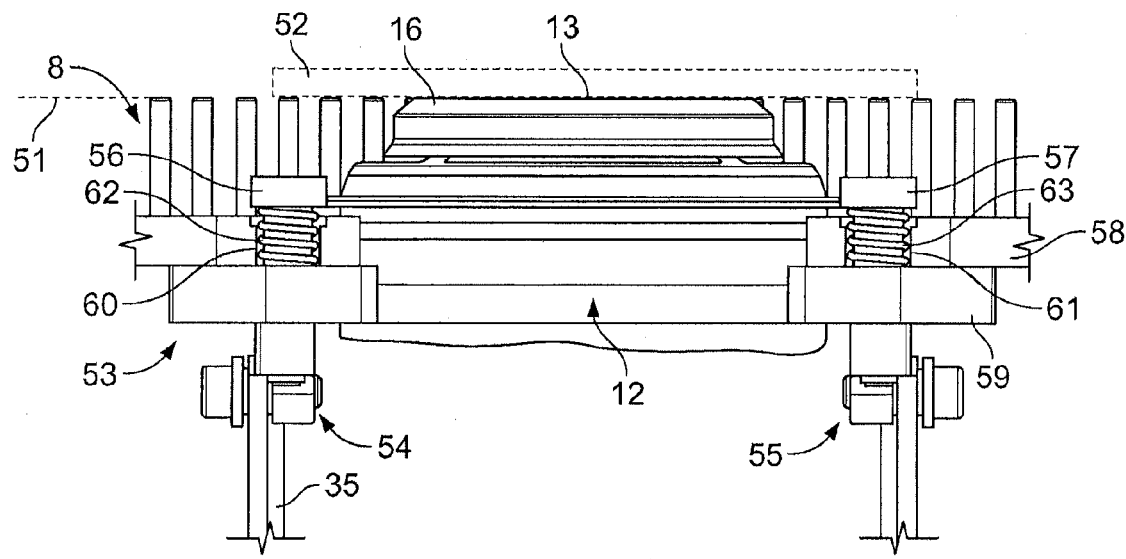
FIGS. 10, 11, and 12, show a workpiece support and a beam receiver of the assembly II according to FIG. 1 with three different relative positions.

In the operating state of the assembly II in FIGS. 5 to 7, the beam receiver 12 and the workpiece support 8 assume the mutual position illustrated in FIG. 10. The distance between the workpiece support 8 and the beam receiver 12 perpendicular to a bearing plane 51 formed at the workpiece support 8 is set to the distance value zero. A workpiece in the form of a metal sheet 52 supported by the workpiece support 8 and indicated in FIG. 10 would consequently also lie on the beam receiver 12, specifically on the end face, facing upwards in FIG. 10, of the edge 16 of the receiving opening 13.

The mutual positioning of the workpiece support 8 and the beam receiver 12 is effected by an adjusting device in the form of an actuator 53. Part of the actuator 53 is the forked connecting rod 35, which is articulated with its two upper ends on the beam receiver 12. For that purpose, the beam receiver 12 has two bearing blocks 54, 55 (FIGS. 6, 10). Next to the articulation points of the connecting rod 35, clamping screws 56, 57 are screwed into the bearing blocks 54, 55 (FIG. 10). With a smooth-walled shank these pass through a base plate 58 of the workpiece support 8 and a supporting flange 59 fixedly connected to the base plate 58 at the underside thereof. The smooth-walled shank of the clamping screws 56, 57 is arranged, inside guide bushings, in through-openings, not shown specifically, of the supporting flange 59, and is therefore guided with little friction and largely free from play in the radial direction. On the other hand, through-openings 60, 61 in the base plate 58 of the workpiece support 8 are radially enlarged. Tension springs 62, 63 in the form of helical springs are inserted in these through-openings and surround the smooth-walled shank of the clamping screws 56, 57; at their axial ends these springs are supported at one end on the supporting flange 59 and at the other end on the underside of screw heads of the clamping screws 56, 57. By virtue of their pre-stress, in the operational state shown in FIG. 10 the tension springs 62, 63 pull the bearing blocks 54, 55 provided on the beam receiver 12 towards the underside of the supporting flange 59 on the base plate 58 of the workpiece support 8.

If, starting from the operational state of the assembly II illustrated in FIGS. 5 to 7, the drive motor 19, likewise forming part of the actuator 53, is driven in a direction of rotation opposite to the direction of rotation during the preceding discharging movement of workpiece support 8 and beam receiver 12, then the spindle nut 22 driven by the drive motor 19 moves the drive plate 23 upwards in the z-direction. Together with the drive plate 23, the driver 25 is displaced in the positive z-direction. The vertically movable plate 26 with the unit comprising workpiece support 8 and beam receiver 12 coupled thereto at first maintains its initial position in the z-direction. The upwardly moving driver 25 consequently pivots the workpiece support 8 into its horizontal position. At the same time, the driver 25 is displaced along the drive plate 23 in the y-direction.

Once the workpiece support 8 is horizontally oriented, then a continued lifting movement of drive plate 23 and driver 25 causes a linearly upwardly directed movement of the workpiece support 8 and the beam receiver 12 attached thereto. Jointly with the assembly comprising workpiece support 8 and beam receiver 12, the vertically movable plate 26 connected to the workpiece support 8 moves in the positive z-direction. The linear lifting movement of workpiece support 8, beam receiver 12 and vertically movable plate 26 is carried out against the action of the restoring force developing at the preloading cylinder 44. The stops for the workpiece support 8 provided at the articulated connection between the workpiece support 8 and the vertically movable plate 26 prevent the workpiece support 8 from pivoting upwards beyond its horizontal position as a result of the action of the driver 25 thereon.

Figure 8:
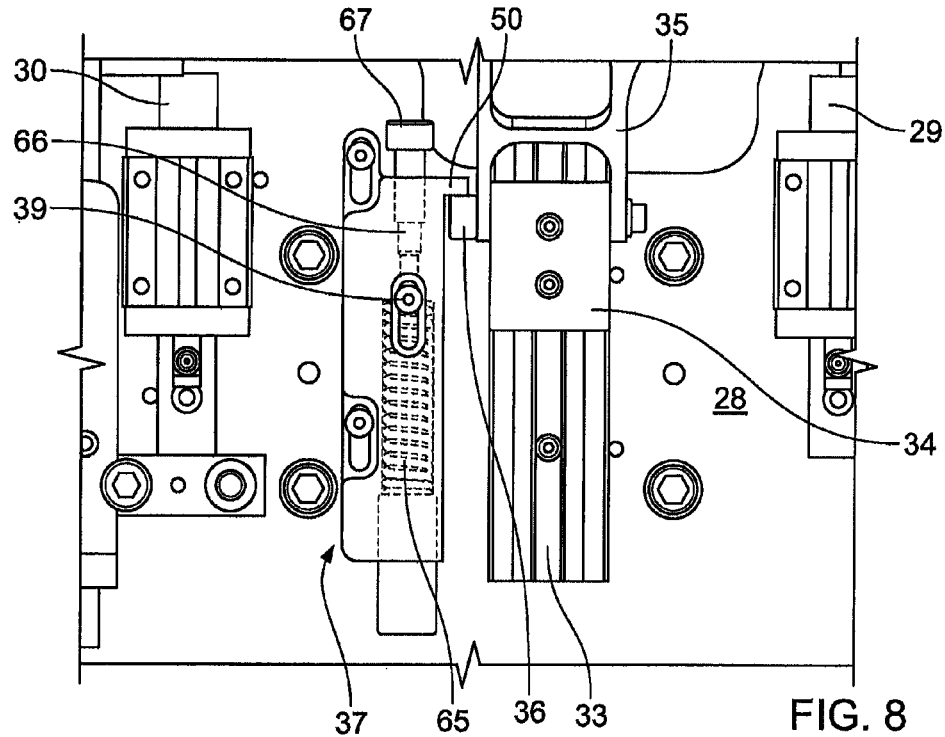

During its movement coupled with the movement of the workpiece support 8, the beam receiver 12 carries the connecting rod 35 articulated on it upwards in the z-direction. The lower end of the connecting rod 35 is consequently displaced in the positive z-direction jointly with the guide slide 34 connected to it and the counter-stop 36 provided at the articulated connection between the lower end of the connecting rod 35 and the guide slide 34, starting from the conditions shown in FIGS. 5 to 7. In the course of the linear movement of workpiece support 8 and beam receiver 12 which is performed with the workpiece support 8 oriented horizontally and which follows the folding up of the workpiece support 8, the counter-stop 36 projecting at the lower end of the connecting rod 35 runs against the stop projection 50 of the stop 37 on the guide plate 28 fixed to the machine frame (FIG. 8). At this moment, the workpiece support 8 and the beam receiver 12 still occupy the mutual position shown in FIG. 10. That is to say, the upper side of the edge 16 on the receiving opening 13 of the beam receiver 12 is still aligned with the free ends of the bristles 10 of the brush area 11.

On continued operation of the drive motor 19, the workpiece support 8 is moved via the drive plate 23 and the driver 25 further in the positive z-direction. Because it is braced against the stop 37 via the connecting rod 35, however, the beam receiver 12 cannot perform this movement with the workpiece support. The outcome of this is a mutual positioning movement of the workpiece support 8 and beam receiver 12 in the direction of the beam axis 14 of the laser beam 15. This positioning movement is effected against the action of the increasingly compressed tension springs 62, 63. The magnitude of the positioning movement is definable as desired, within the limits prescribed by construction, by means of a numerical drive control 64 indicated diagrammatically in FIG. 2.

Figure 11:
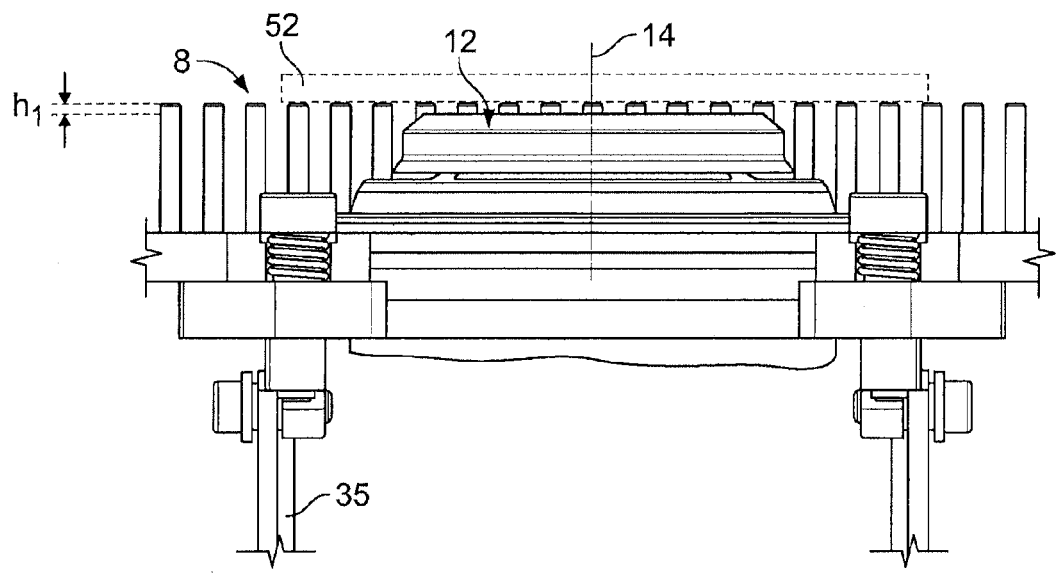
Figure 12:
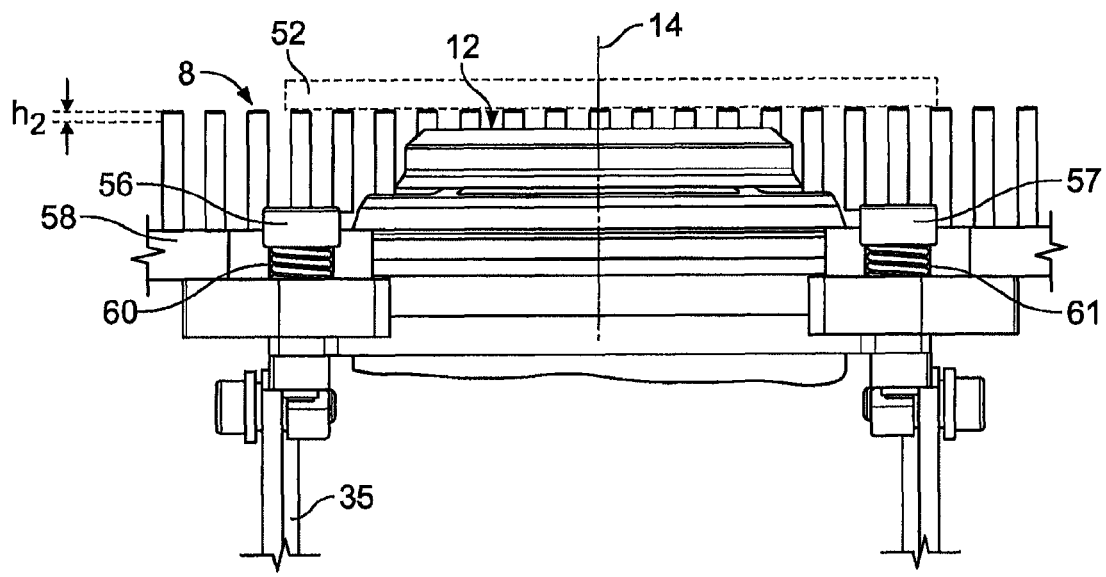

According to FIG. 11, the workpiece support 8 is positioned relative to the beam receiver 12 supported on the stop 37 fixed to the machine frame with a positioning movement of magnitude h1. As is also apparent from FIG. 11, during this mutual positioning of the workpiece support 8 and beam receiver 12 a metal sheet 52 lying on the brush area 11 of the workpiece support 8 is a distance at its underside of h1 from the beam receiver 12. As shown in FIG. 12, the mutual positioning movement of the workpiece support 8 and beam receiver 12, and consequently also the distance between the sheet 52 supported by the workpiece support 8 and the beam receiver 12, has a magnitude h2.

In the example case illustrated, h2 is twice as large as h1. The distance h2 between workpiece support 8 and beam receiver 12 is selected for the case in which the metal sheet 52 is to be moved with a rapid positioning movement over the workpiece support 8. The workpiece support 8 and the beam receiver 12 are set to the mutual distance h1 for slower processing movements, which the metal sheet 52 moved by means of the co-ordinate guide of the laser processing machine 1 performs relative to the laser beam 15. Both during the positioning movement and during the processing movement of the metal sheet 52, contact of the metal sheet 52 with the beam receiver 12 and any associated scratching of the underside of the metal sheet are excluded.

The distance value zero of the mutual distance between the workpiece support 8 and the beam receiver 12 illustrated in FIG. 10 is selected whenever the metal sheet 52 lying on the workpiece support 8 and the beam receiver 12 have the same state of movement, that is, are not moved relative to one another. This is the case, for example, when the metal sheet 52 is resting immobile on the workpiece support 8 and a workpiece processing is effected exclusively by movement of the laser beam 15, which is possible owing to the mobility of the laser processing head on the machine frame 4. Such processing movements of the laser processing head, or rather of the laser beam 15, are performed, for example, to produce the final severance cut when cutting out sheet metal parts.

For reasons associated with construction, the mutual distance of workpiece support 8, or rather the metal sheet 52 and the beam receiver 12, can be set at most to the distance value h2. As FIG. 12 shows, at the distance value h2, the underside of each of the screw heads of the clamping screws 56, 57 runs onto an opposite edge of the respective through-opening 60, 61 in the base plate 58 of the workpiece support 8. Since at the same time the clamping screws 56, 57 are supported via the connecting rod 35 at the stop 37 fixed to the machine frame, the vertical mobility of the workpiece support 8 relative to the beam receiver 12 is thus terminated. At the latest during this operational state of the assembly II, the drive motor 19 switches off as a result of appropriate control. If the drive motor 19 is not switched off when the operational state shown in FIG. 12 is reached, for example, because of a malfunction in the drive control 64, the drive motor 19 can move the unit comprising workpiece support 8, beam receiver 12 and vertically movable plate 26 further in the positive z-direction until the workpiece support 8 approaches a mechanical positive stop. During this extra movement, restricted to failures, the counter-stop 36 at the lower end of the connecting rod 35 articulated on the beam receiver 12 displaces the stop 37 upwards, overcoming a counter-force. This counter-force is generated by an adjusting spring 65 (FIG. 8), which is biased at the underside of the connecting screw 39 fixed to the machine frame, between the connecting screw and the housing of the stop 37. By appropriate mutual matching of the strengths of the adjusting spring 65 on the one hand and the tension springs 62, 63 between the beam receiver 12 and the workpiece support 8 on the other hand, the adjusting spring 65 contracts only during irregular operating states of the described kind and not during normal mutual positioning movements of workpiece support 8 and beam receiver 12 effected with compression of the tension springs 62, 63.

The extra movement of workpiece support 8 and beam receiver 12 caused by malfunction is also guided in the z-direction. This is ensured by the extensions, visible in FIG. 8, of the guide rails 29, 30 fixed to the machine frame, the extensions projecting relative to the linear bearings 31, 32 connected to the vertically movable plate 26.

Figure 9:
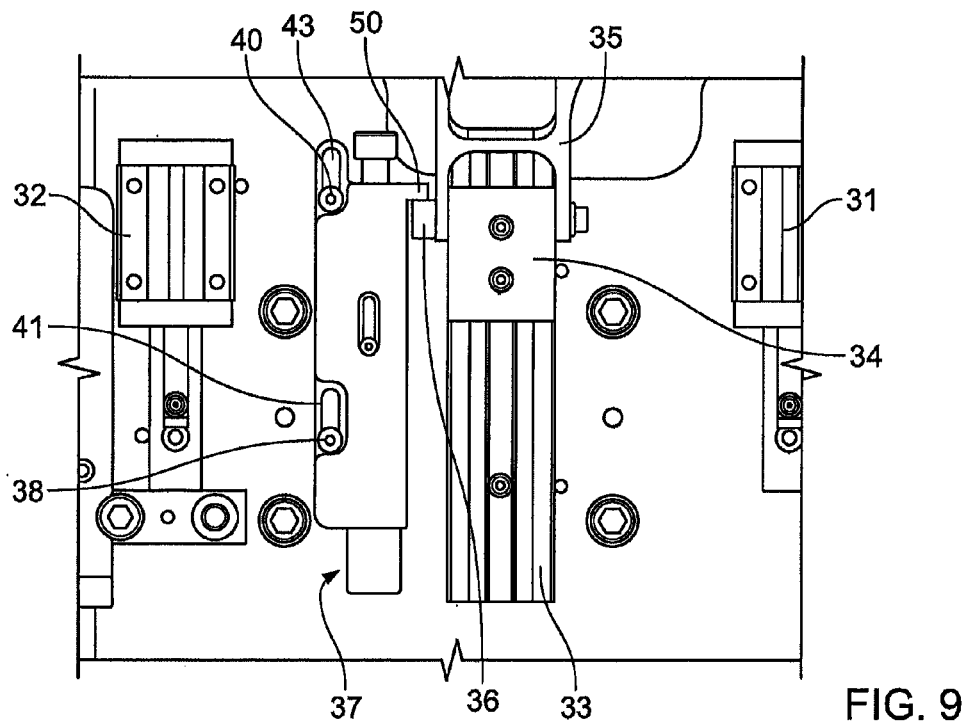

As the workpiece support 8 meets the mechanical positive stop, the situation shown in FIG. 9 occurs at the stop 37 for the connecting rod 35.

The level in the z-direction at which the mutual positioning of the workpiece support 8 and the beam receiver 12 commences, starting from the distance value zero shown in FIG. 10, and hence also the final position which the workpiece support 8 is able to assume during normal operation in the z-direction, can be varied by a vertical adjustment of the stop 37 provided on the guide plate 28 fixed to the machine frame. Such a vertical adjustment is effected inter alia to compensate for shortening of the bristles 10 of the workpiece support 8 caused by wear.

The adjustment mechanism comprises the biased adjusting spring 65 already mentioned above, which is provided as shown in FIG. 8 in a bore inside the stop 37 and which is supported at one end on the housing of the stop 37 and at the other end on the connecting screw 39 engaging in the guide plate 28 fixed to the machine frame. On the side remote from the adjusting spring 65, a set screw 66 acts on the connecting screw 39. The set screw 66 engages in an internal thread on the housing of the stop 37. By turning the set screw 66, depending on the direction of rotation of the set screw 66, the stop 37 can be adjusted, against the effect of the adjusting spring 65, in the positive z-direction or, assisted by the adjusting spring 65, in the negative z-direction. A locking screw 67 is used to secure the adjustment made by means of the set screw 66. In the example case shown, a vertical adjustment of the stop 37 over an adjustment range of 2.5 millimeters is possible.

The distance values to which the distance between the workpiece support 8 and the beam receiver 12 or rather the distance between a metal sheet 52 and the beam receiver 12 is to be set for optimized processing operations, can be determined empirically and stored in the form of control values for the drive motor 19 in the numerical drive control 64. The distance values to be set are dependent on different parameters, for example, the material and the thickness of the workpieces to be processed.

In addition or as an alternative, it is possible individually to define the distance values to be set, i.e. using the particular workpiece to be processed at any one time. The method used for this purpose is sketched in FIGS. 13 to 15.

Figure 13:
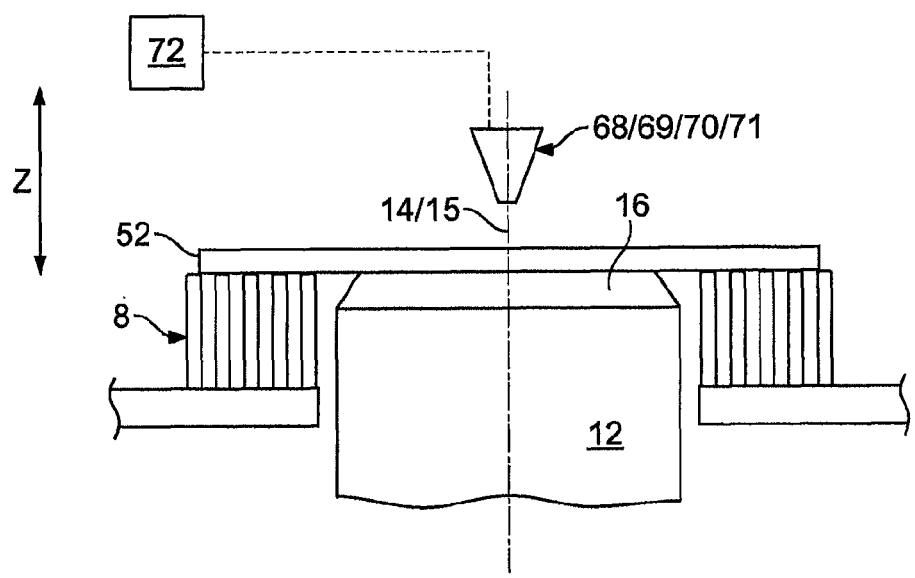
FIGS. 13, 14, and 15, show schematic diagrams to illustrate the determination of a mutual distance to be set of the workpiece support and the beam receiver according to FIGS. 10, 11 and 12.

In FIG. 13, the workpiece support 8 and the beam receiver 12 of the laser processing machine 1 are set to a mutual distance with the distance value zero. The metal sheet 52 accordingly rests both on the brush area 11 of the workpiece support 8 and on the edge 16 of the receiving opening 13 of the beam receiver 12. Above the metal sheet 52 only a laser nozzle 69 of a laser processing head 68 is shown. At the same time the laser nozzle 69 is part of an arrangement 70 for setting the focal position. By means of the arrangement 70 a constant focal position of the laser beam 15 on the metal sheet 52 is ensured during processing movements. For that purpose, the arrangement 70 for setting the focal position comprises a capacitive measuring device 71 for determining the distance between the laser nozzle 69 of the laser processing head 68 and the top face of the metal sheet 52, and an adjusting drive 72 for adjusting the laser processing head 68, that is, the laser nozzle 69, in the z-direction. The laser nozzle 69 is used during the capacitive distance measurement. The arrangement 70 for setting the focal position is of a known construction and is offered in this form by the firm of TRUMPF®.

To determine a distance value for the distance between the workpiece support 8 and the beam receiver 12 at which a contact between the underside of the metal sheet 52 and the beam receiver 12 and damage of the underside of the metal sheet 52 associated with processing of the sheet is reliably excluded, the laser processing head 68 is moved over the beam receiver 12 into a position in which the beam axis 14 of the laser beam 15 (not switched on) runs through the center of the receiving opening 13 of the beam receiver 12. The distance control system of the laser processing head 68 and hence, inter alia, also the adjusting drive 72 is rendered inoperative. The resulting constant level of the laser processing head 68, that is, of the laser nozzle 69, forms the reference level for the subsequent distance measurement.

At the distance value zero of the distance between the workpiece support 8 and the beam receiver 12, the distance between the laser processing head 68 and the laser nozzle 69 and the metal sheet 52 is determined (FIG. 13) by means of the capacitive measuring device 71.

Figure 14:
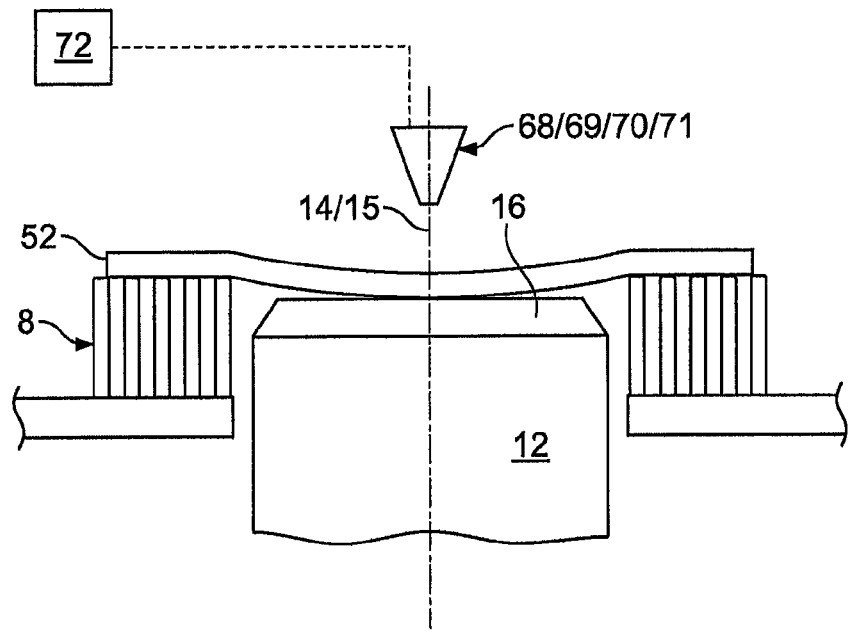

Subsequently, by operating the drive motor 19 of the assembly II, the workpiece support 8 is positioned in the positive z-direction with respect to the beam receiver 12 braced against the stop 37. During this positioning movement, the distance between the laser processing head 68, that is, the laser nozzle 69, and the metal sheet 52 is continuously determined. Owing to the relative movement of workpiece support 8 and beam receiver 12, the metal sheet 52 can sag above the beam receiver 12. The continuously measured distance between the laser nozzle 69 and the metal sheet 52 consequently remains initially unchanged during the mutual positioning movement of workpiece support 8 and beam receiver 12. Once the metal sheet 52 has reached its maximum sag, a continued mutual positioning movement of workpiece support 8 and beam receiver 12 causes the metal sheet 52 above the beam receiver 12 to be raised and accordingly the measured distance between the laser nozzle 69 and the metal sheet 52 to be reduced. FIG. 14 shows the moment at which the metal sheet 52 has just reached its maximum sag.

Figure 15:
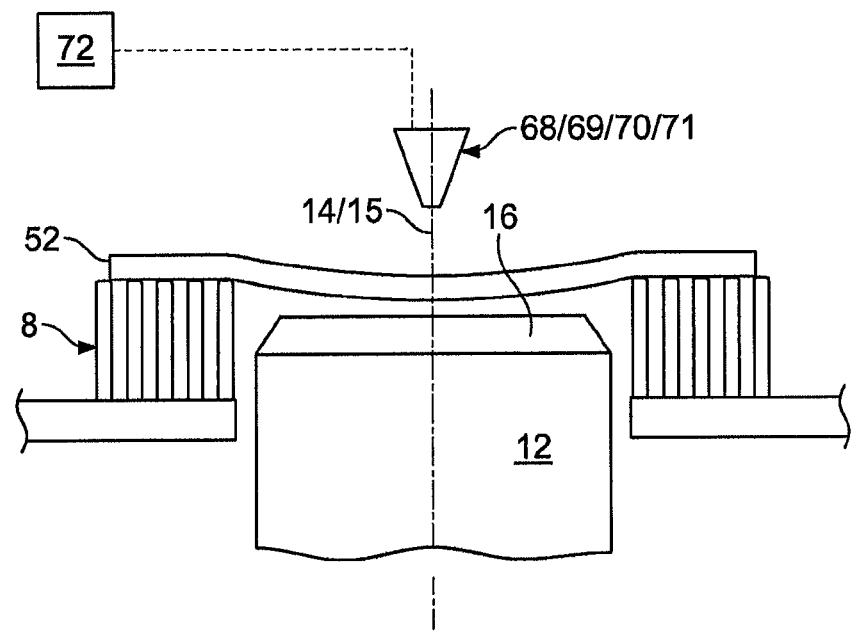

The first determination of a change in the distance between the laser nozzle 69 and the metal sheet 52 marks the moment at which the metal sheet 52 is no longer in contact with the beam receiver 12. The distance value of the distance existing at this moment between the workpiece support 8 and the beam receiver 12 is determined. This distance value is the minimum value that must be set in order to avoid contact between the metal sheet 52 and the beam receiver 12 and any associated scratching of the metal sheet 52 during subsequent workpiece processing. As a precaution, the last end of a set distance value can be of a somewhat larger dimension, for example, 0.2 millimeters larger, than the previously determined minimum distance value. The situation with the final distance value set is shown in FIG. 15. The underside of the metal sheet 52 is an adequately safe distance from the beam receiver 12.

For the workpiece processing that now follows, the distance control system, i.e. inter alia also the adjusting drive 72 for the laser processing head 68, that is the laser nozzle 69, is switched on. On relative movements of the metal sheet 52 and the laser nozzle 69, the distance between the laser nozzle 69 and the metal sheet 52 is therefore kept constant by means of the arrangement 70 for setting the focal distance. This is done by suitable control of the adjusting drive 72 for the laser processing head 68.

If the metal sheet 52 is uneven, the laser processing head 68 performs compensating movements in the z-direction. These compensating movements can be used as a basis for controlling the drive motor 19 of the assembly II. If the drive motor 19 is controlled by the numerical drive control 64 such that the workpiece support 8 and the beam receiver 12 carry out corresponding mutual positioning movements at the same time as the laser processing head 68 is carrying out compensating movements, then the distance value for the distance between workpiece support 8 and the beam receiver 12 set before processing of the workpiece commences can be maintained throughout the entire process-specific relative movement of metal sheet 52 and beam receiver 12.

Both the drive control 64 of the drive motor 19 and the control of the adjusting drive 72 are integrated in a programmable control of the laser processing machine 1. The control programs are generated by means of computer-assisted programming systems and subsequently input into the numerical control of the laser processing machine 1.

A number of embodiments of the invention have been described. Nevertheless, it will be understood that various modifications may be made without departing from the spirit and scope of the invention. Accordingly, other embodiments are within the scope of the following claims.

What is claimed is:

1. A method for processing workpieces using a laser beam, the method comprising:
    supporting a workpiece on a workpiece support;
    piercing the workpiece with a laser beam from a laser processing head that is arranged on a first side of the workpiece, wherein the laser beam enters a receiving opening of a beam receiver arranged on a second side of the workpiece that is opposite the first side of the workpiece; and
    varying the distance between the workpiece and the beam receiver along a beam axis of the laser beam during a varying step using an adjusting device that comprises an adjusting drive having a numerical drive control, wherein the distance between the workpiece and the beam receiver along the beam axis of the laser beam is varied by variably defining, by means of the numerical drive control of the adjusting drive, a magnitude of a positioning movement with which the adjusting drive positions the workpiece support and the beam receiver relative to one another with a positioning movement along the beam axis.

2. The method of claim 1, wherein the varying step comprises adjusting the distance between the workpiece and the beam receiver to two or more distance values, each distance value being correlated to a processing phase of the workpiece processing, wherein the adjusting drive positions the workpiece support and the beam receiver relative to one another along the beam axis with a positioning movement having a corresponding magnitude.

3. The method of claim 1, wherein the varying step comprises adjusting the distance between the workpiece and the beam receiver to a distance value correlated to the material of the workpiece.

4. The method of claim 1, wherein the varying step comprises adjusting the distance between the workpiece and the beam receiver to a distance value correlated to a thickness of the workpiece.

5. The method of claim 1, wherein the varying step comprises, for the duration of at least one processing phase of the workpiece processing, maintaining constant the distance between the workpiece and the beam receiver at a set distance value.

6. The method of claim 1, further comprising empirically determining a distance value for the distance between the workpiece and the beam receiver, storing the distance value in a memory of the numerical drive control of the adjusting drive, and setting the position of the beam receiver to this distance value.

7. The method of claim 1, further comprising determining a distance value to be set for the distance between the workpiece and the beam receiver at the workpiece to be processed, and setting the distance between the workpiece and the beam receiver to this distance value.

8. The method of claim 1, further comprising determining a distance value to be set for the distance between the workpiece and the beam receiver at the workpiece to be processed according to a determination method comprising:

positioning the workpiece support and the beam receiver relative to one another in the direction of the beam axis to a mutual distance with the distance value zero;

with the workpiece on the workpiece support and on the beam receiver, starting from the mutual distance with the distance value zero, positioning the workpiece support and the beam receiver relative to one another in the direction of the beam axis so that the beam receiver is removed from the workpiece;

during the mutual positioning of the workpiece support and the beam receiver with removal of the beam receiver from the workpiece, determining the moment at which the workpiece above the beam receiver reaches a maximum sag;

at the moment at which the workpiece reaches the maximum sag, determining the actual value of the mutual distance between the workpiece support and the beam receiver; and on the basis of the actual value of the mutual distance between the workpiece support and the beam receiver, determining the distance value to be set for the distance between the workpiece and the beam receiver.

9. The method of claim 8, wherein the maximum sag of the workpiece above the beam receiver is determined on the basis of the distance existing along the beam axis of the laser beam between a reference level and the workpiece above the beam receiver.

10. A computer-readable medium having encoded thereon software for operating a laser processing machine for processing workpieces, the machine comprising:

a workpiece support configured to support a workpiece;

a laser processing head configured to deliver a laser beam;

a beam receiver with a receiving opening for the laser beam, which the laser beam enters after piercing through the workpiece, the laser processing head being arranged on the one side of the workpiece and the workpiece support and the beam receiver being arranged on the opposite side of the workpiece; and an adjusting device configured to vary the distance between the workpiece and the beam receiver existing along a beam axis of the laser beam, the adjusting device comprising an adjusting drive configured to position the workpiece support and the beam receiver relative to one another with a positioning movement of variably definable magnitude along the beam axis;

wherein the adjusting drive comprises a numerical drive control configured to variably define the magnitude of the positioning movement with which the workpiece support and the beam receiver are positioned relative to one another along the beam axis; and wherein the software run on the numerical drive control of the adjusting drive comprises instructions for causing the adjusting drive of the adjusting device to variably determine a distance value to be set for the distance between the workpiece support and the beam receiver.

11. The computer-readable medium of claim 10, wherein the software run on the numerical drive control of the adjusting drive comprises instructions for causing the adjusting drive of the adjusting device to variably determine a distance value to be set for the distance between the workpiece support and the beam receiver, the distance value being correlated to a processing phase of the workpiece processing.

12. The computer-readable medium of claim 10, wherein the software run on the numerical drive control of the adjusting drive comprises instructions for causing the adjusting drive of the adjusting device to variably determine a distance value to be set for the distance between the workpiece support and the beam receiver, the distance value being correlated to the material of the workpiece.

13. The computer-readable medium of claim 10, wherein the software run on the numerical drive control of the adjusting drive comprises instructions for causing the adjusting drive of the adjusting device to variably determine a distance value to be set for the distance between the workpiece support and the beam receiver, the distance value being correlated to a thickness of the workpiece.

* * * * *